United States Patent
Toub et al.

(10) Patent No.: US 8,521,721 B2
(45) Date of Patent: Aug. 27, 2013

(54) CUSTOM OPERATORS FOR A PARALLEL QUERY ENGINE

(75) Inventors: Stephen Harris Toub, Seattle, WA (US); Igor Ostrovsky, Bellevue, WA (US); Mike Liddell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 333 days.

(21) Appl. No.: 12/882,168

(22) Filed: Sep. 14, 2010

(65) Prior Publication Data

US 2012/0066250 A1    Mar. 15, 2012

(51) Int. Cl.
*G06F 7/00* (2006.01)
*G06F 17/30* (2006.01)

(52) U.S. Cl.
USPC .......... 707/713; 707/758; 707/759; 707/764; 707/765; 707/769

(58) Field of Classification Search
USPC ................. 707/705, 713, 758, 759, 764, 765, 707/769, 99.1, 999.3, 999.39
See application file for complete search history.

(56) References Cited

U.S. PATENT DOCUMENTS

| | | | |
|---|---|---|---|
| 6,625,593 B1 * | 9/2003 | Leung et al. | 707/999.002 |
| 6,996,557 B1 * | 2/2006 | Leung et al. | 707/999.4 |
| 7,574,424 B2 | 8/2009 | Chowdhuri | |
| 7,949,687 B1 * | 5/2011 | Sinclair | 707/803 |
| 7,984,043 B1 * | 7/2011 | Waas | 707/718 |
| 8,095,553 B2 * | 1/2012 | Dettinger et al. | 707/759 |
| 2002/0198872 A1 * | 12/2002 | MacNicol et al. | 707/3 |
| 2004/0225639 A1 * | 11/2004 | Jakobsson et al. | 707/2 |
| 2005/0177553 A1 * | 8/2005 | Berger et al. | 707/3 |
| 2006/0218123 A1 * | 9/2006 | Chowdhuri et al. | 707/2 |
| 2007/0294307 A1 * | 12/2007 | Chen et al. | 707/200 |
| 2008/0162409 A1 * | 7/2008 | Meijer et al. | 707/2 |
| 2009/0144346 A1 * | 6/2009 | Duffy et al. | 707/205 |
| 2011/0047172 A1 * | 2/2011 | Chen et al. | 707/764 |

OTHER PUBLICATIONS

M. Tsangaries, et al., "Dataflow Processing and Optimization on Grid and Cloud Infrastructures", 2009 IEEE, Bulletin of the IEEE Computer Society Technical Committee on Data Engineering, (8 pages).
Goetz Graefe, "Volcano—An Extensible and Parallel Query Evaluation System", IEEE Transaction on Knowledge and Data engineering, vol. 6, No. 1, Feb. 1994, pp. 120-135.

(Continued)

*Primary Examiner* — Hares Jami
(74) *Attorney, Agent, or Firm* — Workman Nydegger

(57) ABSTRACT

Embodiments are directed to implementing custom operators in a query for a parallel query engine and to generating a partitioned representation of a sequence of query operators in a parallel query engine. A computer system receives a portion of partitioned input data at a parallel query engine, where the parallel query engine is configured to process data queries in parallel, and where the queries include a sequence of built-in operators. The computer system incorporates a custom operator into the sequence of built-in operators for a query and accesses the sequence of operators to determine how the partitioned input data is to be processed. The custom operator is accessed in the same manner as the built-in operators. The computer system also processes the sequence of operators including both the built-in operators and at least one custom operator according to the determination indicating how the data is to be processed.

11 Claims, 4 Drawing Sheets

(56) References Cited

OTHER PUBLICATIONS

Joe Duffy, et al., "Parallel LINQ: Running Queries on Multi-Core Processors", http://msdn.microsoft.com/en-us/magazine/cc163329(printer).aspx, Pub. Date 2007, (8 pages).

Frank Huber, et al., "Query Processing on Multi-Core Architectures", Session 1-Performance, Pub. Date 2009, pp. 27-31.

Milena Ivanova, et al., "Customizable Parallel Execution of Scientific Stream Queries", Proceedings of the 31st VLDB Conference, Pub. Date 2005, pp. 157-168.

Ian Abramson, "Parallel Query—Welcome to the Parallel Query Dimension of Oracle", http://www.pafumi.net/parallel_query.htm, Pub. Date 1997, 11 pages.

* cited by examiner

CUSTOM OPERATORS FOR A PARALLEL QUERY ENGINE

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed specifically to work with multicore or multiprocessor systems. In such systems, data is partitioned into different parts which can each be processed by a different processing thread. By aligning the partitioned parts, the software application can be processed in parallel. In some cases, the processing is performed using queries. The queries use query operators which make guarantees regarding the data's ordering and configuration. The query operators are configured to coordinate with each other and are aware of each other's execution. As such, the query operators operate in a closed system that does not allow for the use of custom operators.

BRIEF SUMMARY

Embodiments described herein are directed to implementing custom operators in a query for a parallel query engine and to generating a partitioned representation of a sequence of query operators in a parallel query engine. In one embodiment, a computer system receives a portion of partitioned input data at a parallel query engine, where the parallel query engine is configured to process data queries in parallel, and where the queries include a sequence of built-in operators. The computer system uses custom operators and built-in operators from the sequence of built-in operators to determine how the partitioned input data is to be processed. The custom operator is accessed in the same manner as built-in operators. The computer system also processes the sequence of operators including both the built-in operators and at least one custom operator according to the determination indicating how the data is to be processed.

In another embodiment, a computer system accesses a sequence of operators configured to process a portion of partitioned input data in a parallel query system. The sequence of operators includes at least one custom operator. The computer system generates a list of the partitions into which the input data has been partitioned and determines the number of partitions that will be made during a re-partitioning operation at an indicated operator. The computer system also generates a partitioned representation of the sequence of query operators, where the partitioned representation provides internal information regarding the processing of the input data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
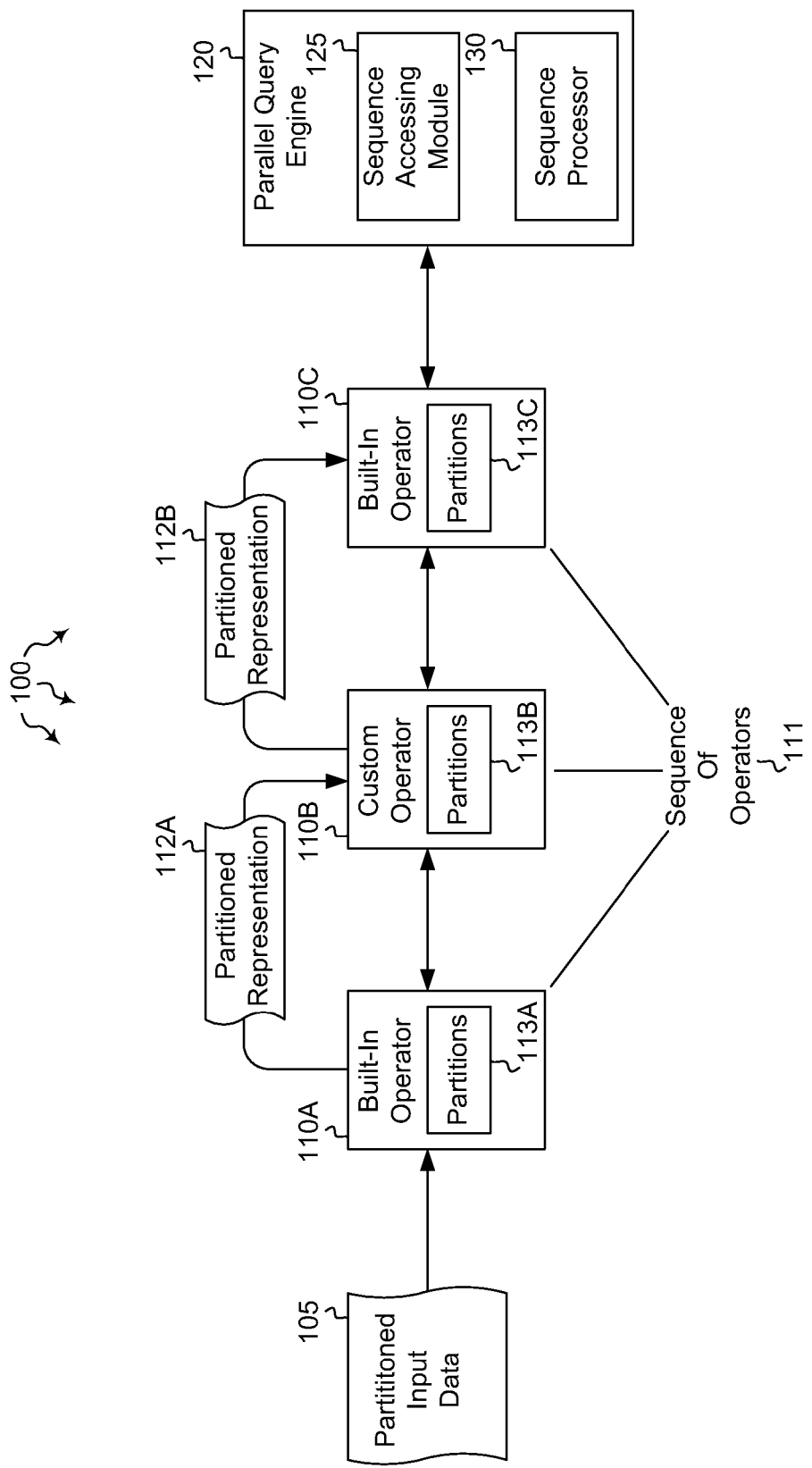
FIG. 1 illustrates a computer architecture in which embodiments of the present invention may operate including implementing one or more custom operators in a query for a parallel query engine.

Embodiments described herein are directed to implementing custom operators in a query for a parallel query engine and to generating a partitioned representation of a sequence of query operators in a parallel query engine. In one embodiment, a computer system receives a portion of partitioned input data at a parallel query engine, where the parallel query engine is configured to process data queries in parallel, and where the queries include a sequence of built-in operators. The computer system allows the incorporation of user-defined (custom) operators into the sequence of built-in operators for a query and accesses the sequence of operators to determine how the partitioned input data is to be processed. The custom operator is accessed in the same manner as the built-in operators. The computer system also processes the sequence of operators including both the built-in operators and custom operators according to the determination indicating how the data is to be processed.

In another embodiment, a computer system accesses a sequence of operators configured to process a portion of partitioned input data in a parallel query system. The sequence of operators includes at least one custom operator. The computer system generates a list of the partitions into which the input data has been partitioned and determines the number of partitions that will be made during a re-partitioning operation at an indicated operator. Initially, the input data at the beginning of the query is partitioned, and that partitioning is performed either automatically by the parallel query engine or through a user-provided mechanism. This step may determine the number of partitions at the beginning of the query. Then, after this initial determination, each operator may accept the number of partitions output by the previous operator, but is able to output a potentially different number of partitions. The computer system also generates a partitioned representation of the sequence of query operators, where the partitioned representation provides internal information regarding the processing of the input data.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other storage device which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes various different components including a parallel query engine. Parallel query engine 120 may be configured to process queries in parallel. Accordingly, when a query is received, the data of the query can be processed concurrently by the parallel query engine. In some cases, a query may be received which includes multiple different portions of input data. The input data may be processed and returned as output data (i.e. a response to a query). The input data may be partitioned (e.g. partitioned input data 105) into one or more different portions. In some cases, these partitioned data portions may be accessed by or used by different query operators.

Query operators, as used herein, are commands or functions that are performed in conjunction with a portion of data. For example, in the Language Integrated Query (LINQ) framework a "Select" operator can be used to map elements in a collection using a projection function. "Where," "Aggregate," "Join/Group Join" and many other query operators may be built in to a given framework. Thus, partitioned data input 105 may be accessed by built-in operators 110A and/or 110C. Each of the built-in operators may repartition the input data as needed. Accordingly, regardless of how many partitions the input data was received in, the built-in operators may add or reduce the number of partitions (113A and 113C, respectively) while processing data. The built-in operators may send a partitioned representation (e.g. 112A) indicating the new partitions to the next operator in the sequence of operators 111.

It should be noted that, the number of partitions between each operator may be established when the query begins processing, rather than when a given operator has completed its processing. As such, a streaming solution is provided where operators hand off data through their output partitions to subsequent operators as individual pieces of data are processed. A part of an operator's definition may include a representation of partitioned data that is made available to a subsequent operator. The representation of partitioned data may be static (fixed count determined early, typically during an initialization phase), or dynamic (the exact number of partitions available may vary during the execution phase of query execution).

Moreover, while a static number of partitions may be used between each operator (decided at runtime), the number of partitions may change dynamically during the query's execution. For example, during processing, an operator may find that it has another processing core available to it. In such cases, the operator may utilize another thread which needs an additional partition. The operator may request such an additional partition from its predecessor operator. As such, custom operators may by dynamically partitioned during the query's execution.

In some embodiments, custom operators (e.g. custom operator 110B) may be added to the sequence of operators. Custom operators may include specially designed functionality that may not be available using the built-in operators. For instance, a user may desire to add sliding window functionality that allows data to be captured or analyzed over a sliding window of time or other unit of measure. The user may be able to provide this functionality with a custom operator. Similar to built-in operators, custom operators may repartition the input data as needed. Thus, as above, regardless of how many partitions the input data was received in, the custom operators may add or reduce the number of partitions (113B) during or after processing the input data. Moreover, the custom operators may also send a partitioned representation (e.g. 112B) indicating the new partitions to the next operator in the sequence of operators 111.

As shown in FIG. 1, parallel query engine 120 includes a sequence accessing module 125 and a sequence processor 130. The sequence accessing module may be configured to access the sequence of operators 111 to determine how the partitioned input data 105 is to be processed (i.e. how it is to be processed by the various operators). Once the sequence accessing module determines how the input data is to be processed, the sequence processor 130 can process the sequence in parallel. These concepts will be explained in greater detail below with regard to method 200 of FIG. 2.

Figure 2:
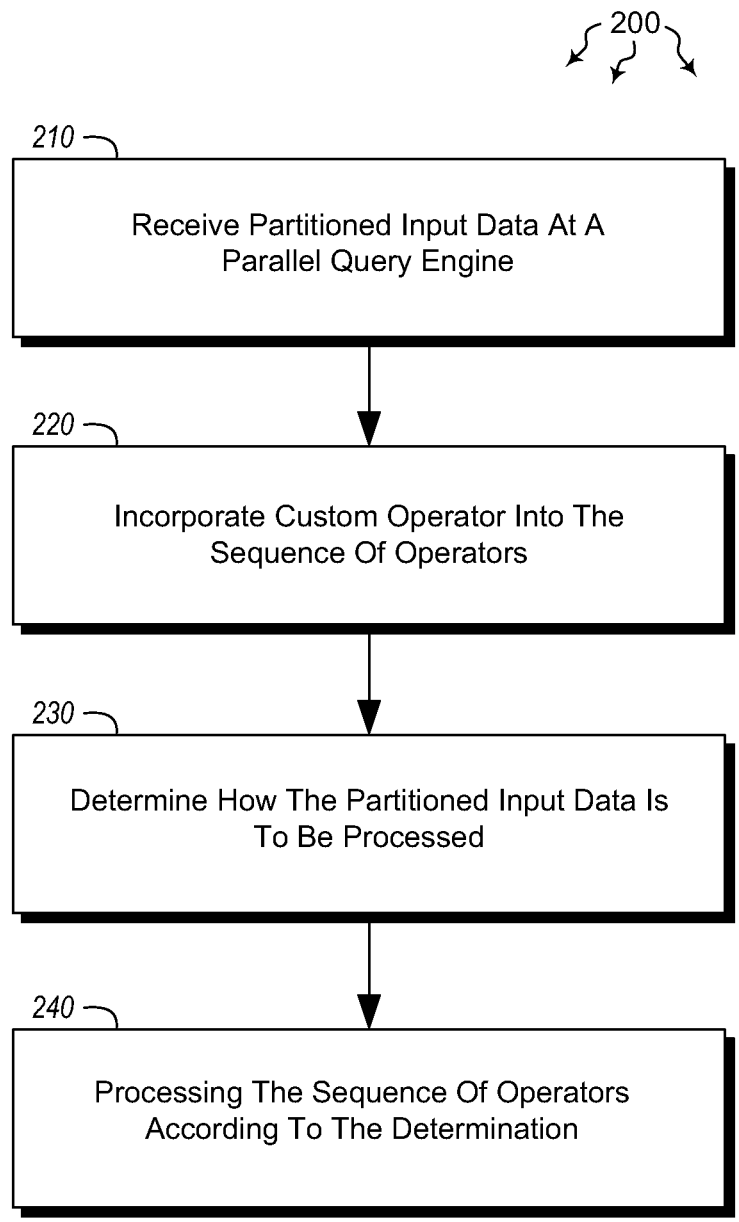
FIG. 2 illustrates a flowchart of an example method for implementing one or more custom operators in a query for a parallel query engine.
Figure 3:
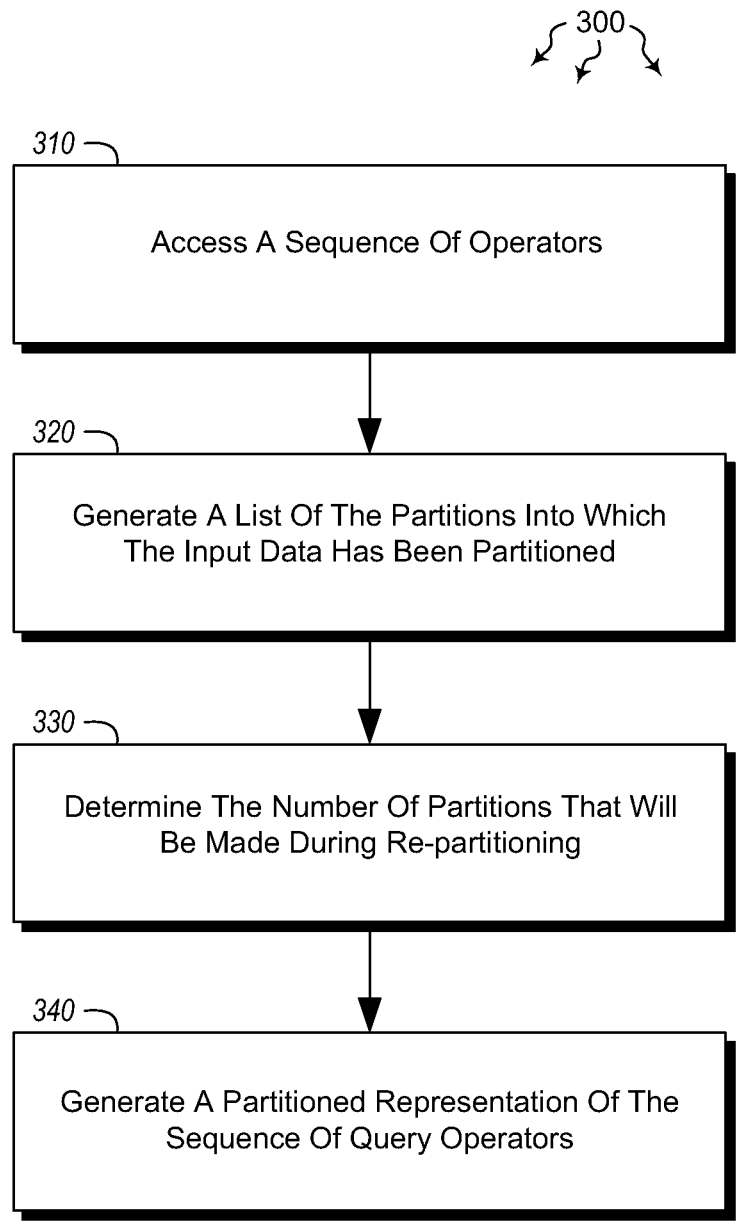
FIG. 3 illustrates a flowchart of an example method for generating a partitioned representation of a sequence of query operators in a parallel query engine.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for implementing one or more custom operators in a query for a parallel query engine. The method 200 will now be described with frequent reference to the components and data of environment 100.

Method 200 includes an act of receiving a portion of partitioned input data at a parallel query engine, wherein the parallel query engine is configured to process data queries in parallel, the queries including a sequence of built-in operators (act 210). For example, parallel query engine 120 may receive partitioned input data 105. The parallel query engine, as mentioned above, is configured to process data queries in parallel. Each query may include multiple different operators which are to perform operations on the input data. The operators may be combined or arranged as a sequence of operators. In some cases, the order of the sequence of operators is important and in others it is not. For instance, one operation may depend on another operation being performed on the data before it can perform its operation. In such a case, the order of operations would be important, and the proper sequence of operators would be enforced.

Method 200 includes an act of incorporating at least one custom operator into the sequence of operators for a query (act 220). For example, a user, computer system or other computer program may incorporate custom operator 110B into sequence of operators 111. Although only one custom operator and two built-in operators are shown in FIG. 1, it will be understood that substantially any number of custom and/or built-in operators may be included, added to or removed from sequence of operators 111.

The custom operator may include specially designed functionality that, in some cases, cannot be provided by built-in operators or even by modified or extended built-in operators. The custom functionality may include any type of software function, application, service or other functionality. The custom operator may be designed by an end-user, an administrator, a developer or any other type of user. In some cases, the custom operators may simply perform a built-in operator's functions more efficiently or in a custom manner. The custom operator may be designed in such a manner that the parallel query engine can access and use the custom operator the same way it would use a built-in operator. Thus, no new or different accessing steps are needed for accessing the custom operators.

Method 200 further includes an act of accessing the sequence of operators to determine how the partitioned input data is to be processed, wherein at least one custom operator is accessed in the same manner as the built-in operators (act 230). For example, sequence accessing module 125 may access sequence of operators 111 to determine how the partitioned input data 105 is to be processed. This determination may include accessing each of the operators in the sequence of operators to determine which functions each operator is to perform on the data.

Method 200 also includes an act of processing the sequence of operators including both the built-in operators and at least one custom operator according to the determination indicating how the data is to be processed (act 240). For example, sequence processor 130 may process sequence of operators 111 including both the built-in operators (110A & 110C) and custom operator 110B in the manner determined by the sequence accessing module.

In some cases, the sequence of operators may be processed in another order such that the last operator in the sequence of operators is activated first. The last operator in the sequence of operators may poll its predecessor operator in the sequence of operators to determine the predecessor operator's output information. In response, the predecessor operators may provide a partitioned representation (112A/112B) that indicates how the data has been (re)partitioned by the operator (including the number of partitions in which the data being output by the predecessor operator is to be partitioned). Processing in this order may continue until the partitioned input data source (i.e. 105) is reached.

In some cases, query processing may result in an error indicating that a problem with the processing of the sequence of operators has occurred. Based on such an indication, the parallel query engine may halt the processing of the query unless or until the problem has been resolved.

The partitioned representations may include ordering guarantees that guarantee a predefined ordering for the input data, as well as information about ordering that may exist in partitions and between partitions. In some cases, the custom operator may be configured to determine whether changes have occurred that affect the ordering guarantees. Still further, the custom operator may be configured to modify at least a portion of the ordering guarantees for subsequent operators in the sequence of operators, based on the determination that changes have occurred that affect the ordering guarantees. Thus, when changes have occurred that affect the ordering guarantees, the custom operator can modify the ordering guarantees in line with the changes.

Partitioned representations 112A and 112B may also include configuration options that identify how the input data is initially and/or currently configured. The representations may include information indicating which operator tasks are ready for processing. In some embodiments, a processing thread may be instantiated for each operator task that is ready for processing. Accordingly, parallel query engine 120 may instantiate multiple concurrent threads to process those operator tasks that are ready for processing. In other embodiments, the parallel query engine may maintain a set of threads to pull data from a final query operator in the sequence of operators. The final query operator may pull data from the operator before it using the same set of threads.

Turning now to FIG. 3, FIG. 3 illustrates a flowchart of a method 300 for generating a partitioned representation of a sequence of query operators in a parallel query engine. The method 300 will now be described with frequent reference to the components and data of environments 100 of FIG. 1 and 400 of FIG. 4.

Method 300 includes an act of accessing a sequence of operators configured to process a portion of partitioned input data in a parallel query system, the sequence of operators comprising at least one built-in operator and at least one custom operator (act 310). For example, sequence accessing module 125 may access sequence of operators 111 to process a portion of partitioned input data 105 in parallel query system 120. Each of the query operators may be configured to re-partition the input data in various different manners.

Figure 4:
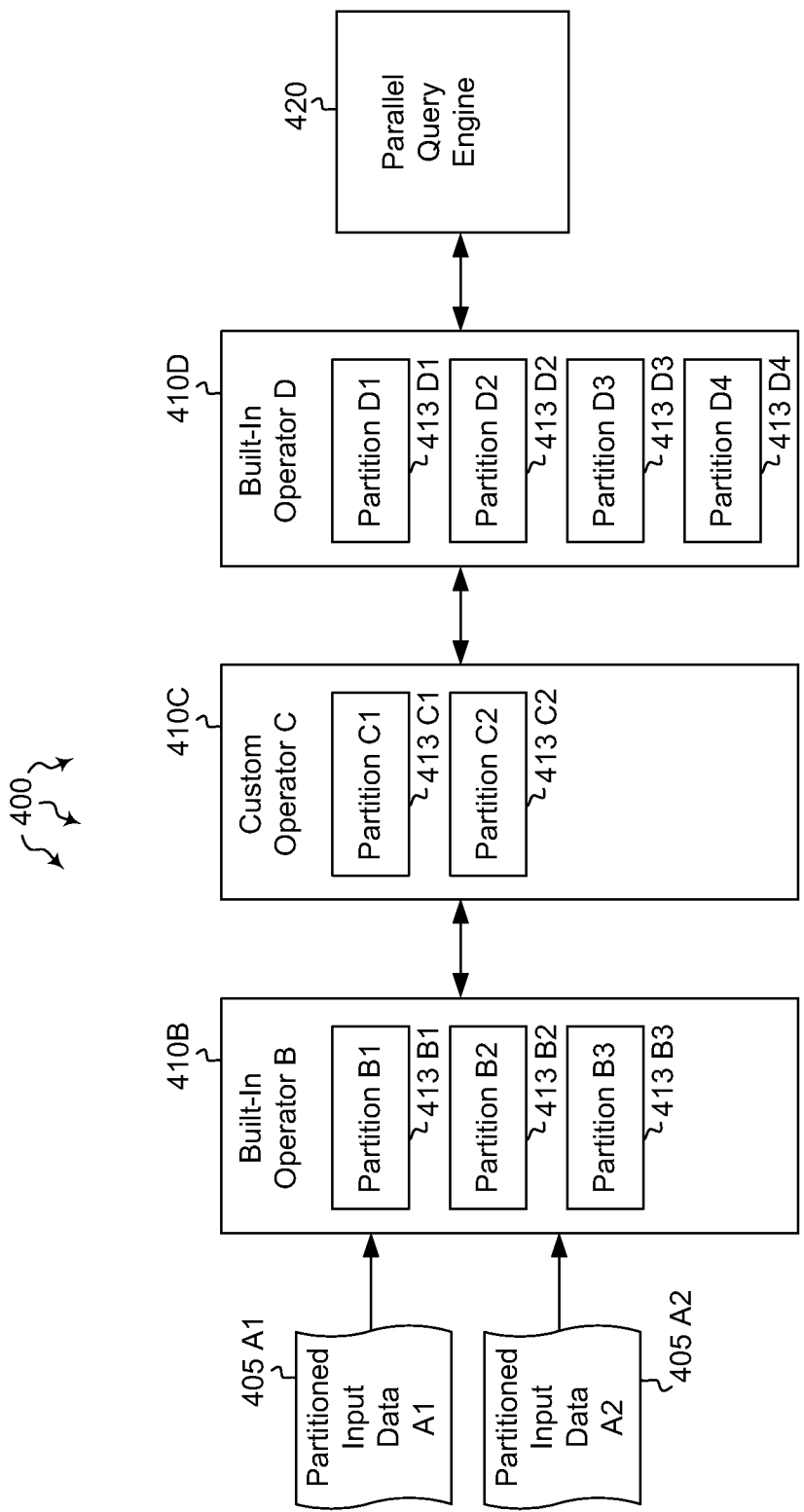
FIG. 4 illustrates an embodiment of the present invention in which input data is repartitioned by various operators.

For example, as shown in FIG. 4, parallel query engine 420 may receive multiple different portions of input data, including partitioned input data A1 (405A1) and partitioned input data A2 (405A2). In one embodiment, the partitioned input data may be repartitioned by built-in operator B (410B) into three different partitions (413B1, 413B2 and 413B3). Custom operator C (410C) may repartition the three partitions into two partitions (413C1 and 413C2). Still further, built-in operator 410D may repartition the two partitions into four partitions (413D1, 413D2, 413D3 and 413D4). It should be noted that arbitrary numbers have been chosen for the number of partitions in this example, and that each operator can repartition the received input data (regardless of how many partitions it is in) into substantially any (higher or lower) number of partitions, at any point in the sequence.

Method 300 includes an act of generating a list of the partitions into which the input data has been partitioned (act 320). For example, parallel query engine 120 may generate a list of partitions which includes the number of partitions at each different operator.

Method 300 also includes an act of determining the number of partitions that will be made during a re-partitioning operation at an indicated operator (act 330). For example, sequence accessing module 125 may access the operators in the sequence of operators 111 to determine how many partitions will be made by each operator.

Method 300 includes an act of generating a partitioned representation of the sequence of query operators, wherein the partitioned representation provides internal information regarding the processing of the input data (act 340). For example, each operator may generate a partitioned representation 112A/112B which provides internal information regarding the processing of input data 105. The partitioned representation may be passed to various other operators in the sequence of operators and the receiving operators may add their own internal partition information to the partitioned representation.

The partitioned representation may provide an indication of those characteristics that are necessary for operators to be included as part of the sequence of operators 111. Moreover, the partitioned representation may provide an indication of those characteristics that are necessary for operators to be efficiently executed.

The following are examples and explanations of pseudo code indicating how various embodiments can be implemented in parallel LINQ (PLINQ):

In Parallel PLINQ, a sequence of operators may be represented as a ParallelQuery<T>. ParallelQuery<T> may be converted to a CustomOperatorPartitioner<T>. This representation may be derived from an OrderablePartitioner<T>, which defines how the data is to be initially partitioned:

```
public abstract class CustomOperatorPartitioner<TSource> :
OrderablePartitioner<TSource>
{
   public QueryConfiguration Configuration { get; }
}
public abstract class OrderablePartitioner<TSource> : Partitioner<TSource>
{
   public virtual IEnumerable<KeyValuePair<long, TSource>>
GetOrderableDynamicPartitions( );
   public bool KeysNormalized { get; }
   public bool KeysOrderedAcrossPartitions { get; }
   public bool KeysOrderedInEachPartition { get; }
   ...
}
public abstract class Partitioner<TSource> { ... }
```

A static method FromParallelQuery may be added to the above code sample to support the generation of a CustomOperatorPartitioner<TSource> from a ParallelQuery<TSource>. This conversion is provided by the parallel query system in order to migrate from built-in operators to custom operators. For instance, the output of the custom operator will be "wrapped" as an CustomeOperatorPartitioner<> and may be indistinguishable from the output of a custom operator. A custom operator is handed a ParallelQuery<TSource> that represents all of its preceeding operators in the query, performs this conversion to obtain a CustomOperatorPartitioner<TSource>, sets up the operator's organization, and returns another ParallelQuery<TSource> that can be consumed by other (built-in or custom) operators. This ParallelQuery<TSource> may be generated by another extension method provided by the parallel query system.

```
public static class CustomOperator
{
   public static CustomOperatorPartitioner<TSource>
FromParallelQuery<TSource>(ParallelQuery<TSource> query);
   public static ParallelQuery<TSource>
ToParallelQuery<TSource>(CustomOperatorPartitioner<TSource>
partitioner);
}
```

In the following code, a custom operator MyOperator is presented that operates on a single partitioned data set (i.e. a single data stream that may have been broken into partitions, but retains a singular identity) and generates a single output is then structured to work on arbitrary ParallelQuery<T> sequences as follows:

```
public static ParallelQuery<TOutput> MyOperator<TSource,TOutput>(this
ParallelQuery<TSource> source)
{
   CustomOperatorPartitioner<TSource> input =
CustomOperator.FromParallelQuery(source);
   CustomOperatorPartitioner<TOutput> output = ... /* new derived-custom
operator partitioner */;
   return CustomOperator.ToParallelQuery(output);
}
```

A custom operator may work on more than one input source and an operator may be processing more than one partitioned data stream, as indicated in the example code below:

```
public static ParallelQuery<TOutput> MyOperator<TSource1,
TSource2, TOutput>(
   this ParallelQuery<TSource1> source1, ParallelQuery<TSource2>
   source2)
{
   CustomOperatorPartitioner<TSource> input1 =
CustomOperator.FromParallelQuery(source1);
   CustomOperatorPartitioner<TSource> input2 =
CustomOperator.FromParallelQuery(source2);
   CustomOperatorPartitioner<TOutput> output = ... /* new
derived-custom operator partitioner */;
   return CustomOperator.ToParallelQuery(output);
}
```

The work performed by a custom operator may include deriving from CustomOperatorPartitioner<T> to implement the GetOrderablePartitions and optionally GetOrderableDynamicPartitions methods. GetOrderablePartitions may be invoked by the parallel query system when a subsequent operator needs to pull data from this operator. The subsequent operator (or the parallel query engine directly if there is no subsequent operator) will specify to GetOrderablePartitions how many partitions are needed. The custom operator's implementation will generate that many partitions, which when enumerated, will in turn call to the custom operator's input CustomOperatorPartitioner<TSource> as created from the supplied ParallelQuery<TSource>. The custom operator may demand the same or a different number of partitions than were requested of it, and its implementation is responsible for pulling data from its source, manipulating that data, and outputting the data to the partitions requested by subsequent operators (here, the partitions are represented as enumerators of position/value pairs).

For instance, in the example below, a Map operator may be implemented which runs a Func<T,U> on each input T to generate an output U. The operator would implement a type like the following:

```
internal class MapCustomOperatorPartitioner<T,U> :
CustomOperatorPartitioner<U>
{
   internal Func<T,U> m_mapper;
   internal CustomOperatorPartitioner<T> m_input;
   internal MapCustomOperatorPartitioner(
      CustomOperatorPartitioner<T> input,
      Func<T,U> mapper)
   {
      m_input = input;
      m_mapper = mapper;
   }
   public override IEnumerable<KeyValuePair<long, U>>
GetOrderableDynamicPartitions( )
   {
      var dynamicPartitioner = input.GetOrderableDynamicPartitions( );
      return CreateMappingEnumerable(dynamicPartitioner);
   }
   private IEnumerable<KeyValuePair<long, U>>
CreateMappingEnumerable(
      IEnumerable<KeyValuePair<long, T>> source)
   {
      foreach(var item in source)
         yield return new KeyValuePair<long,U>(item.Key,
m_mapper(item.Value));
   }
   ...
}
```

The map operator can then be publicly defined as matching the previously described pattern and utilizing this type:

```
public static ParallelQuery<U> Map<T,U>(this
ParallelQuery<T> source, Func<T,U> mapper)
{
    var input = CustomOperator.FromParallelQuery(source);
    var output = new MapCustomOperatorPartitioner<T,U>(input);
    return CustomOperator.ToParallelQuery(output);
}
```

And the new map operation may now be used as part of a query, e.g.

data.AsParallel( ).Where( . . . ).Map( . . . ).ForAll( . . . );

If a developer or other user writing a query specifies additional configuration settings, such as through With* methods, e.g. (data.AsParallel( ).WithCancellation(cancellationToken).Where( . . . ).Map( . . . ).ForAll( . . . )), that configuration data may be available to the query operator on the CustomOperatorPartitioner<T> supplied to it through the QueryConfiguration property. For example, the above cancellation token may be available for the operator to query in order to stop its execution early, as in the example below:

```
private IEnumerable<KeyValuePair<long, U>> CreateMappingEnumerable(
    IEnumerable<KeyValuePair<long, T>> source)
{
    foreach(var item in source)
    {
    m_input.QueryConfiguration.CancellationToken.ThrowIfCancellationRequested( );
        yield return new KeyValuePair<long,U>(item.Key,
    m_mapper(item.Value));
    }
}
```

The CustomOperatorPartitioner<T> also carries with it (through its base type) optimization information about ordering guarantees. The CustomOperatorPartitioner<T> by default will pass along the values it gets from its source, as show in the example code set below:

```
internal MapCustomOperatorPartitioner(CustomOperatorPartitioner<T>
input,Func<T,U> mapper) :
    base(input.KeysOrderedInEachPartition,
input.KeysOrderedAcrossPartitions, input.KeysNormalized)
{
    m_input = input;
    m_mapper = mapper;
}
```

It may be possible for an operator to pass along stronger guarantees than its preceding operators if it performs a sort or similar ordering operation. It is also possible for an operator to pass along weaker than its preceding operators if it manipulates the data in a way that further disrupts its ordering.

Accordingly, as shown in the text and examples provided above, methods, systems and computer program products are provided which implement custom operators in a query for a parallel query engine. Moreover, methods, systems and computer program products are provided which can generate a partitioned representation of a sequence of query operators in a parallel query engine.

Although many specific examples have been provided herein, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, in a computer networking environment including a plurality of computing systems, a computer-implemented method for implementing one or more custom operators in a query for a parallel query engine, the method comprising:

an act of receiving a portion of partitioned input data at a parallel query engine, wherein the parallel query engine is configured to process the partitioned input data using a sequence of operators, including one or more built-in operators that are part of the parallel query engine;

an act of incorporating at least one user-defined custom operator into the sequence of operators for processing the partitioned input data, the at least one user-defined custom operator being provided to the parallel query engine by a user and being configured for processing along with the one or more built-in operators by being configured to:

poll a predecessor operator of the at least one user-defined custom operator in the sequence of operators to determine the predecessor operator's output information, the output information including (i) a number of partitions of the input data that are requestable by the at least one user-defined custom operator and (ii) one or more ordering guarantees that apply to output of the at least one user-defined custom operator;

repartition the input data by adding or reducing the number of partitions of the input data during processing of the input data; and determine whether changes have occurred that affect the one or more ordering guarantees and, when changes have occurred that affect the one or more ordering guarantees, modify at least a portion of the one or more ordering guarantees that apply to the output of the at least one user-defined custom operator;

an act of accessing the sequence of operators to determine how the partitioned input data is to be processed, wherein the at least one user-defined custom operator is accessed in the same manner as the built-in operators as part of the sequence of operators; and an act of processing the sequence of operators, including processing both the built-in operators and the at least one user-defined custom operator, according to the determination indicating how the data is to be processed.

2. The method of claim 1, wherein the parallel query engine maintains a set of threads to pull data from a final query operator in the sequence of operators, and wherein the final query operator pulls data from a preceding operator in the sequence of operators using the same set of threads.

3. The method of claim 2, wherein a processing thread is instantiated for each operator task that is ready for processing.

4. The method of claim 1, wherein the output information includes one or more configuration options identifying how the data is configured.

5. The method of claim 2, wherein one or more different execution mechanisms are employed including at least one of single-thread, multi-thread and one-thread-per-task parallelism.

6. A computer program product for implementing a method for generating a partitioned representation of a sequence of query operators in a parallel query engine, the computer program product comprising one or more hardware computer-readable storage devices having stored thereon computer-executable instructions that, when executed by one or more processors of a computing system, cause the computing system to perform the method, the method comprising:

an act of accessing a sequence of operators configured to process a portion of partitioned input data in a parallel query system, the sequence of operators comprising one or more built-in operators that are part of a parallel query engine and at least one user-defined custom operator, the at least one user-defined custom operator being provided to the parallel query engine by a user and being configured for processing along with the one or more built-in operators by being configured to:

poll a predecessor operator of the at least one user-defined custom operator in the sequence of operators to determine the predecessor operator's output information, the output information including (i) a number of partitions of the input data that are requestable by the at least one user-defined custom operator and (ii) one or more ordering guarantees that apply to output of the at least one user-defined custom operator;

repartition the input data by adding or reducing the number of partitions of the input data during processing of the input data; and determine whether changes have occurred that affect the one or more ordering guarantees and, when changes have occurred that affect the one or more ordering guarantees, modify at least a portion of the one or more ordering guarantees that apply to the output of the at least one user-defined custom operator;

an act of generating a list of partitions into which the input data has been partitioned;

an act of determining a number of partitions that will be made during a re-partitioning operation at an indicated built-in operator in the sequence of operators; and an act of generating a partitioned representation of the sequence of operators, wherein the partitioned representation of the sequence of operators provides internal information regarding the processing of the input data by the indicated built-in operator, the internal information enabling processing of the input data by one of the at least one user-defined custom operator.

7. The computer program product of claim 6, wherein the input data is re-partitioned into a fewer number of partitions by the sequence of operators.

8. The computer program product of claim 6, further comprising:

an act of passing the partitioned representation to one or more other operators in the sequence of operators; and an act of the receiving operators adding their own internal partition information to the partitioned representation.

9. The computer program product of claim 6, wherein the partitioned representation provides an indication of those characteristics that are necessary for operators to be included as part of the sequence of operators.

10. The computer program product of claim 6, wherein the partitioned representation provides an indication of those characteristics that are necessary for operators to be efficiently executed.

11. A computer system comprising the following:

one or more processors;

system memory;

one or more computer-readable storage media having stored thereon computer-executable instructions that, when executed by the one or more processors, causes the computing system to perform a method for implementing one or more custom operators in a query for a parallel query engine, the method comprising the following:

an act of receiving a portion of partitioned input data at a parallel query engine, wherein the parallel query engine is configured to process the partitioned input data using a sequence of operators, including one or more built-in operators that are part of the parallel query engine;

an act of incorporating at least one user-defined custom operator into the sequence of operators for processing the partitioned input data, the at least one user-defined custom operator being provided to the parallel query engine by a user and being configured for processing along with the one or more built-in operators by being configured to:

poll a predecessor operator of the at least one user-defined custom operator in the sequence of operators to determine the predecessor operator's output information, the output information including (i) a number of partitions of the input data that are requestable by the at least one user-defined custom operator and (ii) one or more ordering guarantees that apply to output of the at least one user-defined custom operator;

repartition the input data by adding or reducing the number of partitions of the input data during processing of the input data; and determine whether changes have occurred that affect the one or more ordering guarantees and, when changes have occurred that affect the one or more ordering guarantees, modify at least a portion of the one or more ordering guarantees that apply to the output of the at least one user-defined custom operator;

an act of accessing the sequence of operators to determine how the partitioned input data is to be processed, wherein the at least one user-defined custom operator is accessed in the same manner as the built-in operators as part of the sequence of operators; and an act of processing the sequence of operators, including processing both the built-in operators and the at least user-defined one custom operator, processing the sequence of operators including processing the sequence of operators in reverse order such that a last operator in the sequence of operators polls its predecessor operator in the sequence of operators to determine the predecessor operator's output information.

* * * * *